C. J. HAUSEN.
HOSE SUPPORTER.
APPLICATION FILED JAN. 14, 1915.
1,180,035.
Patented Apr. 18, 1916.
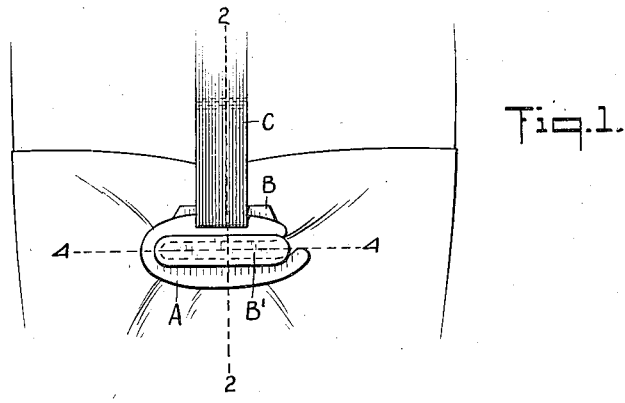
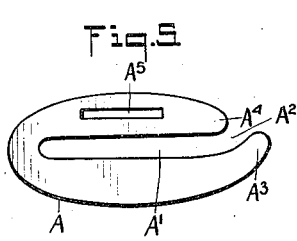
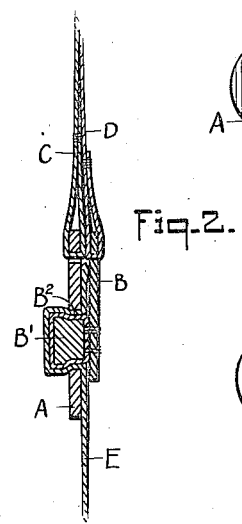
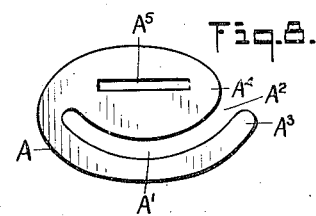
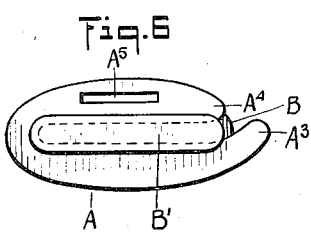
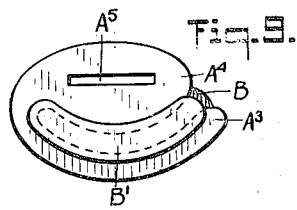
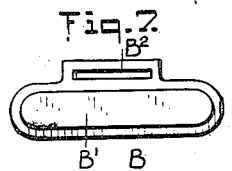
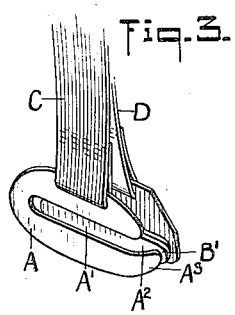
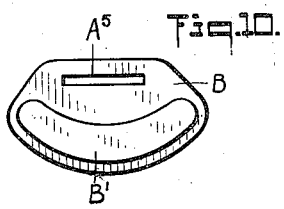
WITNESSES
INVENTOR
Charles J. Hausen
BY
ATTORNEYS

UNITED STATES PATENT OFFICE.

CHARLES J. HAUSEN, OF NEW YORK, N. Y.

HOSE-SUPPORTER.

1,180,035.   Specification of Letters Patent.   Patented Apr. 18, 1916.

Original application filed April 22, 1914, Serial No. 833,691. Divided and this application filed January 14, 1915. Serial No. 2,141.

*To all whom it may concern:*

Be it known that I, CHARLES J. HAUSEN, a citizen of the United States, and a resident of the city of New York, borough of Manhattan, in the county and State of New York, have invented a new and Improved Hose-Supporter, of which the following is a full, clear, and exact description, this being a division of the application No. 833,691, filed by me on April 22, 1914.

The object of the invention is to provide a new and improved hose supporter, arranged to securely grip the hose without danger of tearing the same and to allow of conveniently engaging the supporter with the hose or disengaging it therefrom.

In order to accomplish the desired result, use is made of a supporting member having a sidewise extending slot beginning at one side of the member and extending to within a short distance of the opposite side of the member, the entrance end of the slot being curved upward. Use is also made of a locking member having an elongated button of a resilient material, the shank of the button fitting the wall of the said slot and the head of the button extending in front of the supporting member.

A practical embodiment of the invention is represented in the accompanying drawings forming a part of this specification, in which similar characters of reference indicate corresponding parts in all the views.

Figure 1 is a front elevation of the hose supporter as applied; Fig. 2 is an enlarged cross section of the same on the line 2—2 of Fig. 1; Fig. 3 is a perspective view of the hose supporter, showing the supporting and locking members disengaged; Fig. 4 is an enlarged sectional plan view of the hose supporter on the line 4—4 of Fig. 1; Fig. 5 is a face view of the supporting member; Fig. 6 is a similar view of the supporting member with the locking member in position thereon; Fig. 7 is a face view of the locking member; Fig. 8 is a face view of a modified form of the supporting member. Fig. 9 is a face view of the hose supporter showing a supporting member and a locking member engaged and of modified form; and Fig. 10 is a face view of the locking member for the hose supporter shown in Fig. 9.

The hose supporter consists essentially of a supporting member A and a locking member B, of which the supporting member A is attached to a supporting member C and the locking member B is likewise attached to a tape D fastened to the back of the tape C so that the locking member B extends directly in the rear of the supporting member A, as plainly indicated in Fig. 3. The supporting member A is in the form of a flat plate of metal or a like material, and is provided with a sidewise extending slot A′, beginning preferably at the right-hand side of the member A and extending sidewise to within a short distance of the other side thereof, and the entrance end $A^2$ of the slot A′ is curved in an upward direction, as will be readily understood by reference to the drawings, the slot A′ dividing the plate into an upper and a lower portion, the said portions having noses $A^3$, $A^4$ adjacent the open end $A^2$ of the said slot A′, the nose $A^3$ of the lower portion projecting beyond that of the upper portion and trending upwardly.

The locking member B is preferably in the form of a plate of metal or other material and is provided on its front face with a button of a resilient material and having a head B′ and a neck or shank $B^2$ adapted to fit the walls of the slot A′ at the time the button is sidewise engaged with the said slot by way of the entrance opening $A^2$ so that the head B′ of the button extends in front of the supporting member A.

In using the device the material of the hose E is passed over the button of the locking member B and then the button with the hose material extending over the same is sidewise engaged with the slot A′, as previously explained, so that the hose material is firmly clamped in position between the button and the walls of the slot A′, as will be readily understood by reference to Figs. 1, 2, 4 and 6.

It will be noticed that by providing the supporting member A with the slot A′ and providing the locking member B with the elongated button, it is evidence that a very large gripping surface is provided to engage a considerable area of the material of the hose E, to securely hold the hose in position and to prevent the hose material from being torn.

The slot A′ may be comparatively straight, as shown in Figs. 1, 5 and 6, or it may be curved as indicated in Figs. 8 and 9, it being understood that in either case the button of the locking member B is shaped correspondingly, as will be readily understood by reference to Figs. 1, 6, 7, 9 and 10. It will be noticed that the walls of the slot A' are concentric, that is, spaced an equal distance apart up to the entrance opening A² to insure a firm gripping of the hose material by the button throughout the length of the parallel walls. The supporting and locking members A and B are provided in their upper portions with slots A⁵, B² for engagement by the tapes C and D, the said slots A⁵, B² being located centrally on the plate to maintain the slot A⁵ and the head B' of the button in horizontal position with a view to exert an oval pull on the hose material.

As shown in Fig. 4, it will be noted that the supporting member A is curved longitudinally from a vertical plane so that it may conform to the contour of the leg of the wearer, and also, by such curvature, the elastic button, being perfectly straight, will be bent on entering the curved slot and thus tend to grip the hose material more firmly and prevent slipping or tearing of the same.

The hose supporter, shown and described, is very simple in construction and composed of comparatively few parts, which can be readily interlocked to clamp the hose material in place, or disengaged from each other whenever it is desired to release the hose.

Having thus described my invention, what I claim as new and desire to secure by Letters Patent is:

1. A hose supporter comprising a supporting member consisting of an elongated plate divided into an upper and lower portion by a curved slot extending transversely from one edge toward the opposite edge, the lower portion of said plate having an upwardly trending nose projecting beyond the nose of the upper portion forming an entrance channel to the slot, and a locking member provided with an elongated resilient button adapted to be engaged with the curved slot by way of the entrance channel, the upper and lower faces of said button being flexed by the curved slot and engaging frictionally the upper and lower walls of said slot.

2. A hose supporter comprising a supporting member consisting of an elongated plate divided into an upper and lower portion by a slot extending transversely from one edge toward the opposite edge, the lower portion of said plate having an upwardly trending nose projecting beyond the nose of the upper portion and forming an entrance channel to the slot, and a locking member provided with an elongated resilient button adapted to be engaged with the aforesaid slot by way of the entrance channel, the upper and lower faces of said button being flexed by the slot and frictionally engaging the upper and lower walls of said slot.

In testimony whereof I have signed my name to this sepcification in the presence of two subscribing witnesses.

CHARLES J. HAUSEN.

Witnesses:
THEO. G. HOSTER,
GEORGE H. EMSLIE.